United States Patent [19]

Cruse

[11] Patent Number: 4,765,657
[45] Date of Patent: Aug. 23, 1988

[54] QUICK CONNECT-DISCONNECT COUPLING FOR FLUID LINES

[75] Inventor: Lee H. Cruse, Ozark, Mo.

[73] Assignee: Foster Manufacturing Company, Springfield, Mo.

[21] Appl. No.: 37,935

[22] Filed: Apr. 13, 1987

[51] Int. Cl.[4] ............................................. F16L 37/22
[52] U.S. Cl. ..................... 285/91; 285/315; 251/149.9
[58] Field of Search ............... 285/315, 277, DIG. 25, 285/91; 137/614.06; 251/149.9, 89.5

[56] References Cited

U.S. PATENT DOCUMENTS

| | | | |
|---|---|---|---|
| 2,736,578 | 2/1956 | Rafferty | 251/89.5 X |
| 3,106,379 | 10/1963 | Sciuto et al. | 251/149.9 |
| 3,140,072 | 7/1964 | Sciuto, Jr. | 251/149.9 X |
| 3,589,673 | 6/1971 | Cruse | 251/149.9 |
| 4,437,647 | 3/1984 | Cruse | 285/315 X |

*Primary Examiner*—Thomas F. Callaghan
*Attorney, Agent, or Firm*—Polster, Polster & Lucchesi

[57] ABSTRACT

A quick connect-disconnect coupling for fluid lines has a tubular female member, a sleeve member which encircles and is moveable relative to that female member, a tubular plug which telescopes into one end of that female member, locking surfaces on that sleeve member and on that female member which prevent relative movement between that sleeve member and that female member until the tubular plug has been telescoped into that one end of that female member, and interacting surfaces on that female member and on that sleeve member which require progressive relative movement of that sleeve member and of that female member from a normal, plug-unlocked, fluid-off position to a plug-locked, fluid-on position and then back to that normal plug-unlocked, fluid-off position. The locking surfaces include a plurality of locking pins on one of the members, and a corresponding plurality of recesses in the other of those members; and each recess has an abutting notch at one side thereof which has a configuration that is complementary to one side of one of the locking pins. The plurality of locking pins and the corresponding plurality of notches coact to prevent any cold flowing or peening of the metal of those members, even if the coupling is dropped onto a hard surface from a substantial distance.

29 Claims, 1 Drawing Sheet

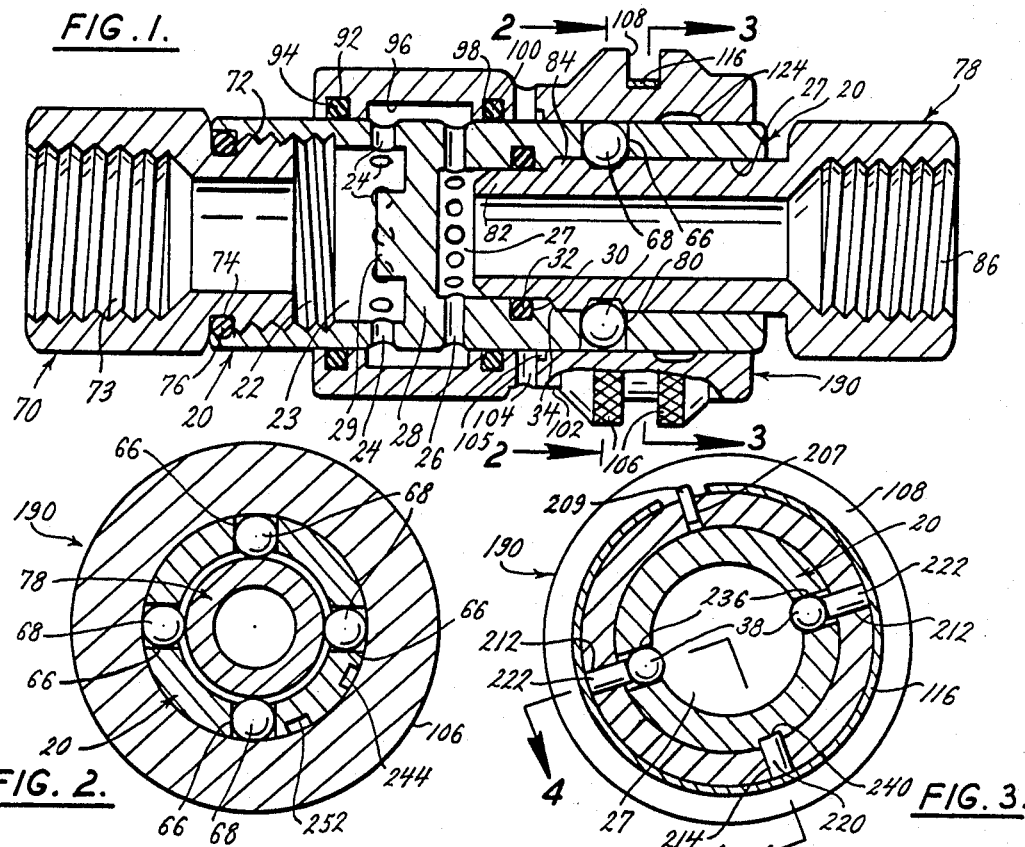
FIG. 1.
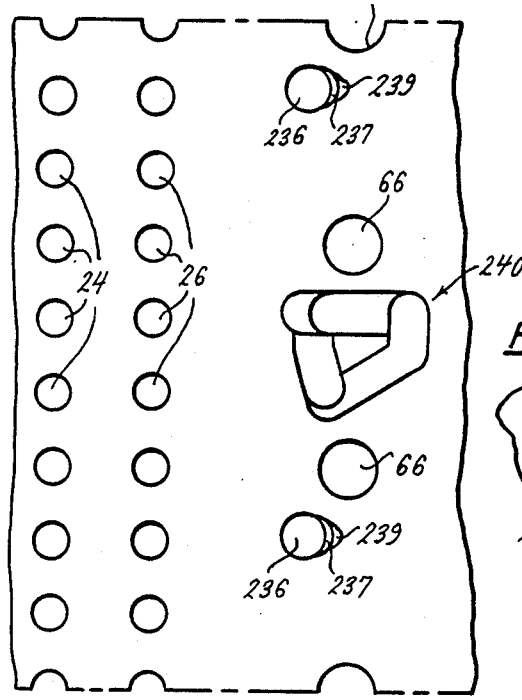
FIG. 2.   FIG. 3.
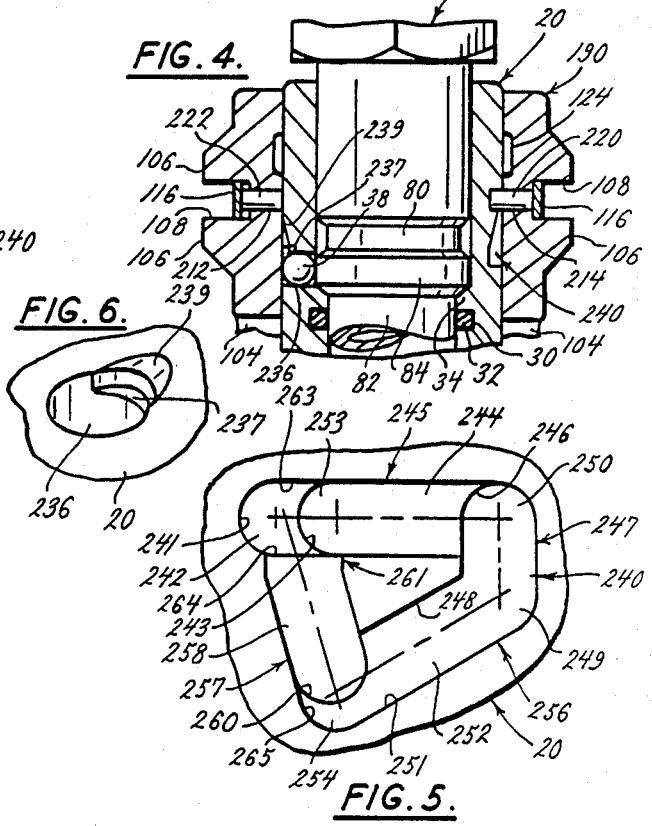
FIG. 4.
FIG. 6.
FIG. 7.   FIG. 5.

QUICK CONNECT-DISCONNECT COUPLING FOR FLUID LINES

CROSS REFERENCE TO PRIOR PATENT

This is an improvement on the quick connect-disconnect coupling in my U.S. Pat. No. 4,437,647 which was granted on Mar. 20, 1984.

BACKGROUND OF THE INVENTION

The quick connect-disconnect coupling of my said patent has proven to be extremely useful and practical. In a very limited number of isolated instances, however recklessly negligent or deliberately vandalistic use of that coupling has led to cold flowing or peening of the metal of the locking surfaces on the female member and/or on the sleeve member. Moreover, in a very limited number of isolated cases, some mischievous users have, after repeated attempts, been able to temporarily by-pass the protective action which is inherent in the normal operation of the interacting means on the sleeve member and on the female member. Specifically, some such users have been able, by applying heavy rotative forces to the female member and to the sleeve member of that coupling while also applying heavy separating forces to those members, to separate the plug from the female member before all of the compressed fluid had escaped through the vent openings of that coupling. Consequently, although the quick connect-disconnect coupling of my said patent is extremely useful and safe under all proper conditions of usage, it would be desirable to make that coupling capable of providing predictable and reassuring operation, even when it is subjected to recklessly negligent or deliberately vandalistic use.

SUMMARY OF THE INVENTION

A quick connect-disconnect coupling for fluid lines provides a plurality of locking means between the sleeve member and female member of that coupling. Those locking means include a plurality of locking pins on one of those members and a plurality of complementary recesses in the other of those members. Each of the recesses has an abutting notch at one side thereof, and those notches have configurations which are complementary to the configurations of the confronting sides of the locking pins. As a result, those locking means can provide substantial surface-to-surface engagements therebetween in the event the coupling is dropped, or thrown, onto the floor with the free end thereof striking the floor. The total areas of engagement between the sides of the locking pins and the notches at the sides of the recesses are large enough to enable the metal of the locking means to fully resist cold flowing or peening. It is, therefore, an object of the present invention to provide the sleeve member and female member of a quick connect-disconnect coupling for fluid lines with a plurality of locking pins on one of those members, with a plurality of complementary recesses in the other of those members, and with an abutting notch at one side of each recess that has a configuration which is complementary to the configuration of the side of one of the locking pins.

The locking pin of each locking means is disposed within the recess of that locking means whenever the sleeve member and the female member of the coupling are in their normal, plug-unlocked, fluid-off position. Each locking pin and recess will normally help prevent undesired relative movement between the sleeve member and the female member; but each locking pin will be raised out of that recess whenever relative movement between the sleeve member and the female member is desired—as is the case after a plug has been telescoped into the female member. To make certain that manufacturing tolerances cannot interfere with free raising movement of each locking pin out of the recess therefor, whenever relative movement between the sleeve member and the female member is desired, the surface of the member which contains the recess is relieved adjacent each recess. The resulting inclined surfaces on that member facilitate ready movement of that locking pin out of that recess. It is, therefore, an object of the present invention to relieve those surfaces, of a member of a coupling, which have locking recesses therein, to provide inclined surfaces on that member to facilitate ready movement of locking pins out of the locking recesses.

The coupling provided by the present invention has interacting surfaces on the sleeve member and on the female member which take the form of a track in one of those members and a track-follower on the other of those members. That track has a first section which extends from a normal, plug-unlocked, fluid-off position to a plug-locked, fluid-on position, has a further section which is inclined to the first section and which extends to and communicates with a still further section that also is inclined to the first section but which extends to and communicates with that first section via a final section. An abrupt angle is subtended by the further and still further sections; and that angle enforces a halting of the relative movement, of the female member and of the sleeve member, from the plug-locked, fluid-on position toward the normal plug-unlocked, fluid-off position. Also, that angle enforces an abrupt change of direction of the relative movement of the female member and of the sleeve member. A further abrupt angle is subtended by the first and final sections of the track; and that angle enforces a halting of the relative movement, of the female member and of the sleeve member, from a plug-locked, fluid-off position toward the normal, plug-unlocked, fluid-off position. Moreover, that further angle enforces a further abrupt change of direction of the relative movement of the female member and of the sleeve member. Those two haltings of relative movement, and those two abrupt changes of direction of the relative movement, give the compressed fluid in the fluid line, of which the coupling is a part, an opportunity to fully vent before that relative movement reaches the normal, plug-unlocked, fluid-off position. It is, therefore, an object of the present invention to provide a track and a track follower for a coupling of a fluid line, which enforce two haltings of relative movement, followed by two abrupt changes of direction of relative movement, of the female member and sleeve member of that coupling.

The further section of the track has an inclination, relative to the axis of the coupling, which enables that further section to respond to strong efforts to enforce relative rotation of the female member and of the sleeve member in one direction to cause relative movement of those members back toward a plug-locked, fluid-on position. That direction of movement is the direction of movement which must be provided during the relative movement of the female member and of the sleeve member in the still further track section and in the final section to reach the normal, plug-unlocked, fluid-off position. This means that if the rotative forces—which should not be applied to the female member and to the sleeve member until those members are causing the track follower to move through the still further track section toward the normal, plug-unlocked, fluid-off position—are mischievously applied to those members while that track follower is moving through the further track section, the inclination of that further track section will cause relative movement of those members back toward a plug-locked, fluid-on position. It is, therefore, an object of the present invention to provide the further section of a track, of the coupling of the present invention, with an inclination, relative to the axis of that coupling, which enables that further section to respond to strong efforts to enforce relative rotation of the female member and of the sleeve member in one direction to cause relative movement of those members back toward a plug-locked, fluid-on position.

Locking means are provided between the plug and the female member of the coupling of the present invention; and those locking means include balls and holes which receive those balls. Those holes are distributed circumferentially of the coupling, and one pair of those holes is disposed on opposite sides of one of the locking recesses which normally help hold the female member and the sleeve member against relative movement, another pair of the holes is disposed on opposite sides of a second of those locking recess, and one of the holes of the first pair of holes and one of the holes of the other pair of holes are disposed on opposite sides of the track which constitutes part of the interacting surfaces between the sleeve member and the female member. It is, therefore, an object of the present invention to provide one pair of locking holes on opposite sides of one of the locking recesses of a coupling and another pair of locking holes on opposite sides of a second of those locking recesses, with one of the holes of the first pair of holes and one of the holes of the other pair of holes on opposite sides of the track which constitutes part of the interacting surfaces between the sleeve member and the female member.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

BRIEF DESCRIPTION OF THE DRAWING

In the drawing, FIG. 1 is a longitudinal section through a preferred embodiment of quick connect-disconnect coupling that is made in accordance with the principles and teachings of the present invention;

FIG. 2 is a sectional view which is taken along a plane that is indicated by the line 2—2 in FIG. 1;

FIG. 3 is a sectional view which is taken along a plane that is indicated by the line 3—3 in FIG. 2, but the plug has been removed;

FIG. 4 is a sectional view which is taken along the two planes that are at right angles to each other and that are denoted by the line 4—4 in FIG. 3;

FIG. 5 is a plan view, on a much larger scale, of a track in the female member of the coupling of FIG. 1;

FIG. 6 is a perspective view of one of the locking recesses and adjacent notch in the female member of the coupling of FIG. 1; and FIG. 7 is a developed view, on a scale intermediate those of FIG. 1 and FIG. 5, of a portion of the surface of the female member of the coupling of FIG. 1.

DETAILED DESCRIPTION OF PREFERRED EMBODIMENT

Referring to the drawing in detail, the numeral 20 denotes a tubular socket which constitutes the female member of one preferred embodiment of quick connect-disconnect coupling for fluid lines. An internal thread 22 is provided at the lefthand end of that socket; and that internal thread constitutes part of the inner surface of a cavity 23 which extends inwardly from the lefthand end of that socket and which has the inner end thereof defined by a partition 28. A cylindrical boss 29 extends into that cavity from the lefthand face of that partition, as shown particularly by FIG. 1. A number of radially-directed ports 24 are formed in the wall of cavity 23 adjacent the inner end of that cavity.

The numeral 27 denotes a cavity which is coaxial with the cavity 23, but which is separated from that cavity by the partition 28. The cavity 27 extends to the righthand end of the socket 20, as shown by FIG. 1. A number of radially-directed ports 26, which are disposed to the right of partition 28, extend through the wall of cavity 27 to place that cavity in communication with the exterior of socket 20. The partition 28 prevents direct communication between the cavities 23 and 27.

The numeral 30 denotes an annular groove in the inner surface of the cavity 27; and that groove is disposed to the right of the ports 26. An O-ring 32 is disposed within that annular groove; and the diameter of a transverse section of that O-ring is greater than the depth of the groove 30. As a result, the inner surface of that O-ring normally projects into the cavity 27.

An inclined shoulder 34 constitutes part of the inner surface of the cavity 27; and that shoulder is disposed to the right of the annular groove 30, as shown by FIG. 1. That shoulder interconnects a large diameter, righthand portion of cavity 27 with a small diameter, lefthand portion of that cavity. Radially-directed recesses 236 are provided in the wall of socket 20; and those recesses are disposed intermediate the inclined shoulder 34 and the open end of the cavity 27, as shown by FIG. 4. The inner ends of those recesses are smaller in cross section than the rest of those recesses; and hence balls 38 can be disposed within those recesses so only the inner ends of those balls can extend inwardly of the cylindrical inner surface of the cavity 27. The diameter of each of the balls 38 is slightly larger than the wall thickness of the righthand portion of the cavity 27, as shown by FIG. 4.

The numeral 66 denotes four radially-directed, circumferentially-spaced holes in the walls of socket 20; and those holes are disposed to the right of the inclined shoulder 34 and are intermediate the recesses 236 and the open end of the cavity 27. The inner ends of those holes are smaller in cross section than the rest of those holes, so only the inner ends of the balls 68 can extend through those recesses and inwardly of the inner surface of the cavity 27, as shown by FIG. 1. The socket 20 is machined from a single piece of metal.

The numeral 70 generally denotes a supply fitting of standard and usual design; and that supply fitting has an external thread 72 which mates with the internal thread 22 of socket 20. An annular groove 74 is provided in the outer surface of the supply fitting 70 adjacent the lefthand end of the external thread 72. An internal thread 73 is provided at the lefthand end of that supply fitting to accommodate an external thread on a tubular part of a system for a pressurized fluid such as compressed air. However, if desired, an external thread could be provided at the lefthand end of fitting 70. An O-ring 76 is disposed within the annular groove 74; and it will be compressed as the external thread 72 is rotated to the right, relative to the internal thread 22, of socket 20. That O-ring will provide an air-tight seal between the internal thread 22 and the external thread 72.

The numeral 78 denotes a tubular plug which constitutes the male member of the preferred embodiment of quick connect-disconnect coupling for fluid lines which is provided by the present invention. The lefthand end of that plug is denoted by the numeral 82; and it is dimensioned to telescope within the small diameter lefthand portion of cavity 27 of socket 20, as shown by FIG. 1. That lefthand end of that plug will expand the O-ring 32, which is disposed within the groove 30; and that O-ring will then provide an air-tight seal between plug 78 and socket 20. An annular rib 84 which has inclined faces is disposed between, and helps define the inner end 82, and also helps define an annular groove 80, as shown by FIG. 1. That groove is dimensioned to accommodate the inner ends of the balls 68, as shown by FIG. 1. The lefthand inclined face of annular rib 84 will serve as an inclined plane to move the balls 38 outwardly until they project beyond the outer surface of the socket 20, as will occur whenever the plug 78 has the reduced-diameter lefthand end 82 thereof moved into the small diameter lefthand portion of the cavity 27. The righthand inclined face of annular rib 84 also will serve as an inclined plane to move the balls 68 outwardly as the plug 78 is moved to the right from the position of FIG. 1. An internal thread 86 is provided adjacent the righthand end of plug 78; and that thread will accommodate an external thread on a further tubular part of a system for a pressurized fluid such as compressed air. However, if desired, an external thread could be provided at the righthand end of plug 78.

The numeral 190 generally denotes a sleeve which is dimensioned to telescope over, and to closely encircle, the outer surface of socket 20. An annular groove 92 is provided at the inner surface of that sleeve adjacent the lefthand end of that sleeve, as shown by FIG. 1. An O-ring 94 is disposed within that groove; and that O-ring will be compressed, and hence will provide a fluid-tight seal between sleeve 190 and socket 20, whenever that sleeve is telescoped over that socket. An annular recess 96 is formed in the inner surface of sleeve 190 a short distance to the right of the annular groove 92; and that recess has an axial dimension which enables it to simultaneously communicate with the ports 24 and with the ports 26, as indicated by FIG. 1. However, the axial dimension of annular recess 96 is short enough so that recess can be wholly displaced away from the ports 26. The numeral 98 denotes an annular groove which is formed in the inner surface of sleeve 190, and which is disposed a short distance to the right of the annular recess 96. An O-ring 100 is disposed within the groove 98; and that O-ring will be compressed, and hence will provide a fluid tight seal between sleeve 190 and socket 20, whenever that sleeve is telescoped over that socket. A wide annular groove 102 with diverging sides is provided in the external surface of the sleeve 190, and that groove is a short distance to the right of the annular groove 98, as shown by FIG. 1. A number of radially-directed, circumferentially-displaced holes 104 are provided in the sleeve 190; and the outer ends of those holes communicate with the annular groove 102 while the inner ends of those holes communicate with an annular groove 105 in the inner surface of sleeve 190, as shown by FIG. 1.

Two annular knurled surfaces 106 are provided at the exterior of the sleeve 190; and those knurled surfaces are disposed to the right of the external annular groove 102. Those annular knurled surfaces are close together, and they define a narrow annular groove 108 therebetween. A recess 207 in the sleeve 190 communicates with the groove 108; and a further recess 214 in that sleeve also communicates with that groove. The recesses 207 and 214 are on the same diameter of the sleeve 190. Two further recesses 212 are provided in the sleeve 190, and they also communicate with the groove 108. The recesses 212 slidably receive locking pins 222, the recess 214 slidably receives a pin 220, and the recess 207 receives a roll pin 209. The recesses 212 lie on a diameter which is displaced ninety degrees from the diameter on which the recesses 207 and 214 lie. The diameters of the locking pins 222 are smaller than the diameters of the recesses 236—to facilitate entry of the inner ends of those pins into those recesses.

The numeral 116 denotes a split-ring spring which is disposed within the annular groove 108. The ends of that spring are disposed adjacent the roll pin 209; and hence that pin will prevent any appreciable circumferential shifting of that spring relative to the sleeve 190. The spring 116 will hold the inner end of the pin 220 inwardly of the inner surface of the cavity 27; and that spring will normally hold the inner ends of the pins 222 inwardly of that inner surface. The inner end of the pin 220 will be accommodated by a track which is generally denoted by the numeral 240 and which is machined into the exterior surface of the socket 20. The inner ends of the pins 222 will be accommodated by the outer ends of the recesses 236 in the socket 20; and the spring 116 will cause those pins to urge the inner ends of the balls 38 inwardly of the surface of the recess 27.

The numeral 124 denotes an annular groove in the inner surface of the sleeve 190; and that groove is displaced to the right of the external groove 108, as shown by FIG. 1. The annular groove 124 is dimensioned to accommodate the outer ends of the balls 68, which are held within the holes 66 of socket 20.

The inner ends of the pins 222 will lie in the outer ends of the recesses 236 of the socket 20, or in notches 237 which are in that socket and which communicate with those recesses, whenever the plug 78 is spaced away from that socket. As a result, those pins will coact with those recesses or notches to lock the sleeve 190 in a plug-unlocked, fluid-off position as long as no plug 78 is telescoped into the socket 20. This means that a careless or mischievous person cannot shift that sleeve from its normal fluid-off position to a fluid-on position as long as the cavity 27 is devoid of a plug 78. Consequently, those pins and those recesses or notches keep such a person from using the coupling to direct jets of pressurized fluid toward nearby persons or objects.

At the time the pins 222 are in the recesses 236 or notches 237, the sleeve 190 will be displaced to the left of the position which is shown in FIG. 1; and the annular recess 96 will be displaced from the ports 26. Consequently, although compressed air from the tubular fitting 70 will be able to fill the cavity 23 of socket 20 and the annular recess 96 of the sleeve 190, that air will not be able to reach the ports 26. Consequently, the coupling will prevent any passage of air through it, as long as a plug 78 is not inserted within the cavity 27 of socket 20.

The socket 20, with its internal thread 22, cavity 23, ports 24, ports 26, cavity 27, partition 28, boss 29, annular groove 30, O-ring 32, inclined shoulder 34, balls 38, holes 66 and balls 68 preferably will be substantially identical to, and will perform the same functions as, the identically-numbered components of the coupling that is shown in my said patent. The supply fitting 70 of FIG. 1 preferably will be identical to, and will perform the same functions as, the identically-numbered supply fitting in the coupling of my said patent. The plug 78 of FIG. 1 preferably will be identical to, and will perform the same functions as, the identically-numbered plug of the coupling of my said patent.

The numeral 240 generally denotes the track which is formed in the outer surface of the socket 20. That track has (1) an initial section 245 which extends from a normal plug-unlocked, fluid-off position 242 to a plug-locked, fluid-on position 250, (2) a second section 247 which extends from position 250 to a further plug-locked, fluid-on position 249, (3) a third section 256 which extends from position 249 to a plug-locked, fluid-off position 254, and (4) a fourth section 257 which extends from position 254 to a final section 261 that communicates with the initial section 245. In all sizes of couplings provided by the present invention, the initial section 245 is parallel to the axis of the socket 20 and the second section 247 is at a right angle to that axis; and, in one of those sizes of couplings, the third section 256 is displaced from that axis by an angle of thirty degrees and forty minutes, the fourth section 257 is displaced from the third section by an angle of seventy-three degrees and fifty-eight minutes, and the final section 261 is displaced from the axis of socket 20 by a right angle. All sections of the track 240 are dimensioned to accommodate the inner end of the track-following pin 220 which is largely held within the recess 214 in the sleeve 190.

Whenever the locking pins 222 are disposed within the recesses 236 or notches 237, the track-following pin 220 will be in the normal plug-unlocked, fluid-off position 242 of track 240. At such time, the socket 20 and the sleeve 190 will be in their normal, plug-unlocked, fluid-off positions.

After a plug 78 has been introduced into the cavity 27, and then moved far enough inwardly to enable the rib 84 thereon to cause the balls 38 to move the locking pins 222 out of the recesses 236 or notches 237, the sleeve 190 can be moved relative to the socket 20. At such time, the balls 68 will be in register with the annular groove 80 in that socket; and, as the sleeve 190 is moved toward the position of FIG. 1, it will force the inner ends of those balls into that groove to lock the plug 78 against separation from the socket 20.

The inner end of the pin 220 will always remain within the track 240; and the initial movement of that pin will have to be axially of the socket 20—along the initial section 245—because a stop 264 will keep that pin from entering the final section 261. As the pin 220 moves along the initial section 245, it will move radially inwardly of socket 20 as it moves past a stop 243, will pass a plug-locked, fluid-off position 253, will be gradually moved radially outwardly of socket 20 by a ramp 244, and then will move radially inwardly of socket 20 as it moves past a stop 246 to reach the position 250. Very shortly after the pin 220 has been moved away from the concave wall 241 at the left-hand side of the position 242, the sleeve 190 will force the inner ends of the balls 68 into the groove 80 in the plug 78; and, as that pin is moved past the stop 243 to position 253, it will be moved radially inwardly of socket 20 by the spring 116. The stop 243 will keep the pin 220 from moving back from the plug-locked, fluid-off position 253 to the normal, plug-unlocked, fluid-off position 242. The sleeve 190 has to be moved axially to move the pin 220 along the initial section 245; and, while that pin is being so moved, the annular recess 96 will move into register with the ports 26—to permit compressed fluid to flow from supply fitting 70 to plug 78 via cavity 23, ports 24, annular recess 96, ports 26, and cavity 27 into that plug. Although the pin 220 will be moved radially outwardly of socket 20 by the ramp 244, the spring 116 will move that pin radially inwardly of that socket as it moves past the stop 246 into the position 250. The stop 246 will keep pin 220 from moving back from position 250 along the initial section 245 toward the normal plug-unlocked, fluid-off position 242.

The pin 220 will usually remain in the plug-locked, fluid-on position 250 until such time as it is desirable to (a) separate the plug 78 from the rest of the coupling or (b) use that coupling as a valve to selectively permit, or prevent, the flow of air through that coupling.

If the plug is to be separated from the rest of the coupling, the sleeve 190 will be (1) rotated relative to the socket 20 to cause the pin 220 to move along the second section 247 from the plug-locked, fluid-on position 250 to the further plug-locked, fluid-on position 249, (2) both rotated and translated to cause that pin to move along the third section 256 from the further plug-locked, fluid-on position 249 to the plug-locked, fluid-off position 254, (3) rotated and translated to cause that pin to move along the fourth section 257 from the plug-locked, fluid-off position 254 to the final section 261, (4) rotated through that final section into the initial section 245, and (5) moved axially against the wall 241 at the side of position 242. At such time, the plug 78 can be withdrawn from the socket 20. As the pin 220 is moved along the second section 247, it will be gradually moved radially outwardly of socket 20, because that section has a ramp-like bottom surface. As that pin is moved along the third section 256, it will be moved even further radially outwardly of socket 20—this time by a ramp 252. That pin will remain in its outward radial position relative to socket 20 until it is moved a short distance along the fourth section 257 to enable it to pass a stop 260. At that time the spring 116 will move the pin 220 radially inwardly of socket 20; but, as that pin is moved through that fourth section, it will again be moved radially outwardly of that socket—this time by a ramp 258. As the pin 220 is moved through the final section 261 and into the initial section 245, it will pass the stop 264; and the spring 116 will again move that pin radially inwardly of socket 20.

It will be noted that as the pin 220 was moving through the section 256 toward the position 254, it was moving downwardly and to the left in FIG. 5 at an angle of thirty degrees and forty minutes from the axis of socket 20. When that pin reached the position 254, the wall 265 of the fourth section 257 brought the movement of that pin to an abrupt halt. To move into the section 257, the pin 220 must experience an abrupt change of direction of seventy-three degrees and fifty-eight minutes. This means that when the user of the coupling has caused the pin 220 to reach the position 254, he can no longer move the sleeve 190 in the direction which caused that pin to move to that position. That user will then have to reverse the relative direction of rotation of the sleeve 190 and socket 20, and also will have to apply a component of movement to that sleeve which is opposed to the direction of movement which that sleeve followed as pin 220 was being moved through section 256 toward position 254—because the axis of section 257 is displaced from the axis of section 256 by less than ninety (90) degrees. As the pin 220 moves through the final section 261 into the initial section 245, it will engage the wall 263 of the initial section 245; and its movement will again be brought to an abrupt halt. To move into the normal, plug-unlocked, fluid-off position 242, the pin 220 must experience a further abrupt change of direction—about ninety (90) degrees. The abrupt halting of the movement of the pin 220, and hence of the sleeve 190, by the wall 265 at position 254, and the immediately-succeeding abrupt change of direction to enable that pin to enter the fourth section 257 are important; because they provide time during which the pressurized fluid can largely escape from the fluid line to which the plug 78 is connected. The abrupt halting of the movement of the pin 220, and hence of the sleeve 190, by the wall 263 of section 245, and the immediately-succeeding abrupt change of direction to enable that pin to move to the normal, plug-unlocked, fluid-off position 242 also are important; because they provide additional time during which the pressurized fluid can escape from the fluid line to which the plug 78 is connected. The overall time, which is provided by the two abrupt haltings of the movement of pin 220, and hence of sleeve 190, and by the two immediately-succeeding abrupt changes of direction, is more than enough to fully relieve the pressure that was applied to the pressurized fluid in the line to which the plug 78 is attached. As a result, even the quickest, and most adept, mischievous user of the coupling of the present invention can not separate the plug 78 from the rest of the coupling so quickly that he will be able to direct explosive, and potentially hurtful, blasts of compressed fluid at nearby persons and objects.

Once the pin 220 has been moved past the stop 260 in the fourth section 257, that pin cannot be moved back to the position 254 without moving through the full length of the track 240. However, as long as the user of the coupling leaves the pin 220 in the third section 256, he can use the coupling as a valve to selectively permit, or prevent, the flow of pressurized fluid through it. Specifically, as long as the user leaves the pin 220 in, or close to, the position 249, the annular recess 96 in the sleeve 190 will be in communication with the ports 26 as well as the ports 24; and hence pressurized fluid will flow through the coupling. However, whenever the user moves the pin 220 close to, or into, the position 254, the annular recess 92 in sleeve 190 will be displaced from the ports 26; and hence pressurized fluid will not be able to flow through the coupling. The user will be able to repeatedly move the pin 220 toward, into, and out of position 249, and also will be able to repeatedly move that pin toward, into, and out of position 254, as long as he does not permit that pin to enter the fourth section 257 and move pass the stop 260. All of this means that a user can use the coupling as a valve to repeatedly turn "on" or turn "off" the pressurized fluid flowing to the line connected to the plug 78.

From the time the pin 220 was moved away from the position 242, until that pin was moved past the stop 264 and then moved to the left into close proximity to the concave wall 241 at position 242, the annular recess 124 in the inner surface of the sleeve 190 was out of register with the holes 66, in the socket 20, for the locking balls 68. As a result, those locking balls were held within the annular recess 80 in the outer surface of the plug 78, and thereby prevented separation of that plug from the rest of the coupling. This means that the plug 78 was positively locked to the rest of the coupling throughout (1) the time required for the pin 220 to move far enough along ramp 244 toward position 250 to enable the annular recess to span the ports 24 and the ports 26, (2) all of the time the sleeve 190 was in position to permit pressurized fluid to pass through the coupling, and (3) the time for that pin to reach position 254, to move through sections 257 and 261, and to move into initial section 245, and then start moving toward position 242.

If a mischievous user were to apply a heavy rotational force to the sleeve 190 which would urge the pin 220 against the side wall 248 of the third section 256—in an effort to effect a rapid movement of that pin through the sections 257 and 261 as soon as that pin reached the position 254—that heavy force would be resolved into a component of force which was at right angles to that wall and into a component of force which was parallel to that wall. The component of force which was parallel to the wall 248 would, because of the angle of that wall relative to the axis of the socket 20, force the pin 220 to the right in FIG. 5. In doing so, that component of force would urge the sleeve 190 back toward a plug-locked, fluid-on position, and would thereby resist the efforts of the mischievous user to effect quick separation of the plug 78 from the rest of the coupling. Further, the application of that heavy rotational force to the sleeve 190 would desirably lengthen the time which the mischievous user would require to apply an oppositely-directed rotational force to that sleeve—as he would have to do to cause that sleeve to move toward the plug-unlocked initial position. It should also be noted that if a mischievous user tried to enhance rapid movement of the pin 220 along the third section 256 from the position 249 toward the position 254—by causing the sleeve 190 to apply a heavy rotational force to that pin which would urge that pin against the wall 251 of that section, that heavy force would develop a component of force that was normal to that wall, and also would develop a further component of force that was parallel to that wall. The component of force which was parallel to that wall would encourage the movement of the pin 220 along the section 256 from the position 249 toward the position 254; but that component of force would tend to additionally delay the separation of the plug 78 from the rest of the coupling, because that component of force is about one hundred and six (106) degrees away from the direction the pin 220 would have to follow as it was subsequently moved through the fourth section 257. It thus should be apparent that by providing a relatively large angle between the axis of section 256 and the axis of the socket 20, the present invention enables the wall 248 or the wall 251 of that section to respond to heavy, circumferentially-directed rotational forces to resist or delay the separation of the plug 78 from the rest of the coupling.

In one size of coupling provided by the present invention, the axis of section 256 coacts with the axis of the socket 20 to subtend an angle of thirty degrees and forty minutes. However, that angle could be as small as twenty-two (22) degrees. The diameter of the socket 20, the number of holes 66, and the diameters of those holes determine the upper limit of the angle between the axis of section 256 and the axis of socket 20. The average of the angles, between the axis of sections 256 and of socket 20 of the various sizes of couplings of the present invention, is twenty-three degrees and forty-five minutes.

As shown particularly by FIG. 7, the track 240 is disposed between two of the holes 66 for the locking balls 68. One of the recesses 236 is located between one of the holes 66 adjacent the track 240 and a further hole 66; and the other of the recesses 236 is positioned between the other hole 66 adjacent the track 240 and a still further hole 66. The four holes 66 in the socket 20 are spaced apart ninety (90) degrees, as shown particularly by FIG. 2.

The radius of curvature of each notch 237 is identical to the radius of curvature of the pin 222 which will enter that notch. The recesses 236 have depths equal to the thickness of the socket 20, as shown by FIG. 3; but the depths of the notches 237 are much shallower, as shown by FIG. 6. However, the notches 237 are deep enough to fully accommodate the inner ends of the pins 222 when the spring 116 makes the outer ends of those pins flush with the surface of the annular groove 108. Each of the notches 237 has an angular extent of about one hundred and twenty (120) degrees; and hence those notches provide substantial surface-to-surface support for the sides of the pins 222.

The holes 212 for the pins 222 are disposed so those pins will be within the recesses 236 or the notches 237 whenever the coupling is in its normal, plug-locked, fluid-off position—as when the pin 220 is in the position 242. The use of the same radius of curvature for the notches 237 and for the pins 222 enables those pins to receive substantial surface-to-surface support from those notches, rather than mere line contact from the recesses 236—as was the case in prior quick connect-disconncet couplings. The substantial surface-to-surface support, which the pins 222 receive from the walls of the notches 237, completely prevents any cold flowing or peening of the metal of the walls of the notches 237 or of the sides of the pins 222—even where the sleeve 190 tends to move toward the free end of socket 20 when the coupling is dropped, or thrown onto, the ground so that free end strikes the ground with great force. As a result, the present invention makes it possible for a coupling to withstand accidental, or even mischievous, use which would, in prior couplings, tend to cause cold flowing or peening of the metal. Any such cold flowing or peening of the metal would be objectionable, because it would tend to restrict ready movement of the sleeve 190 relative to the socket 20.

Whenever the annular rib 84 on the plug 78 engages the balls 38, those balls should move far enough outwardly to move the inner ends of the pins 222 outwardly of the recesses 236 and outwardly of the notches 237—the split-ring spring 116 yielding to permit such outward movement. However, in some prior couplings, manufacturing tolerances did not enable the ribs on the plugs to force the balls far enough outwardly of the recesses to free the pins from those recesses. In those events, the pins jammed, and thereby prevented movement of the sleeves relative to the sockets at times when such movement should be permitted. To avoid any such blocking of movement, the present invention provides reliefs 239 in the surface of the socket 20 adjacent the notches 237, as shown particularly by FIGS. 6 and 7. Those reliefs serve as inclined planes; and they will guide the inner end of each pin 222 all the way out to the cylindrical surface of the socket 20—even if manufacturing tolerances were to keep that rib and either of the balls 38 from moving the inner end of either pin all the way out to that cylindrical surface.

It will be noted that the plug 78 can not be separated from the rest of the coupling until the pin 220 has been moved back to the normal, plug-unlocked, fluid-off position 242. At such time, the user can easily start moving that pin along the initial section 245—as by leaving the plug 78 in the socket 20 or by re-inserting that plug in that socket, and by applying an axially-directed force to the sleeve 190. This is in contrast to one or more prior couplings, wherein the plug could be separated from the rest of the coupling while the track-following pin was in a transversely-directed portion of the track of that coupling. Where that occurred, a user could not immediately move the sleeve axially; and some users have used hammers or other instruments to try to enforce such axial movement—with consequent injury to the coupling. All such injury is avoided by the present invention; because the plug 78 can not be separated from the rest of the coupling until the pin 220 has been moved back (a) into the initial section 245 and (b) to the normal, plug-unlocked, fluid-off position 242.

Whereas the drawing and accompanying description have shown and described a preferred embodiment of the present invention, it should be apparent to those skilled in the art that various changes may be made in the form of the invention without affecting the scope thereof.

What I claim is:

1. A connect-disconnect coupling for fluid which comprises a female member, a sleeve member which encircles said female member, said female member having an outer surface, said sleeve member having an inner surface which bears against, and moves relative to, said outer surface on said female member, whereby said members are relatively moveable, a plug which is dimensioned to telescope into one end of said female member, locking means on said female member and on said plug that selectively respond to telescoping movement of said plug into said one end of said female member and to relative movement of said sleeve member and female member into plug-locked position to lock said plug in position within said one end of said female member and that respond to relative movement of said sleeve member and female member to plug-unlocked position to release said plug for movement away from said female member, and further locking means on said sleeve member and on said female member which selectively lock said members against, or free said members for, relative movement, said further locking means including a locking pin on one of said members and a recess in the other of said members and a notch in said other of said members, said recess having transverse dimensions which are larger than the transverse dimensions of said locking pin, said sleeve member moving toward said one end of said female member in the event said plug has been removed from said female member and said female member is dropped on said one end thereof, one side of said pin and one side of said recess approaching each other whenever said sleeve member moves toward said one end of said female member, said notch being at said one side of said recess and opening to said recess, and said notch having a configuration that is substantially complementary to said one side of said locking pin, whereby said one side of said locking pin can engage said notch in surface-to-surface engagement and receive full support throughout the full length of said surface-to-surface engagement in the event said plug has been removed from said female member and said female member is then dropped on said one end thereof.

2. A connect-disconnect coupling as claimed in claim 1 wherein said sleeve member is said one of said members and said female member is said other of said members, wherein said recess extends from said outer surface of said female member to an inner surface of said female member and wherein said notch extends inwardly from said outer surface of said female member but stops short of said inner surface of said female member.

3. A connect-disconnect coupling as claimed in claim 1 wherein a part of the surface of said other of said members, adjacent said notch, is relieved to facilitate movement of said locking pin out of, and away from, said recess and notch whenever said sleeve member is to be moved toward said one end of said female member.

4. A connect-disconnect coupling as claimed in claim 1 wherein said sleeve member is said one of said members and said female member is said other of said members, wherein said recess extends from said outer surface of said female member to an inner surface of said female member and wherein said notch extends inwardly from said outer surface of said female member but stops short of said inner surface of said female member, and wherein a part of the surface of said female member, adjacent said notch, is relieved to facilitate movement of said locking pin out of, and away from, said recess and notch whenever said sleeve member is to be moved toward said one end of said female member.

5. A connect-disconnect coupling as claimed in claim 1 wherein said further locking means includes a further locking pin on said one of said members and a further recess in said other of said members and a further notch in said other of said members, said further recess having transverse dimensions which are larger than the transverse dimensions of said further locking pin, one side of said further locking pin and one side of said further recess approaching each other whenever said sleeve member moves toward said one end of said female member, said further notch being at said one side of said further recess and opening to said further recess, and said further notch having a configuration that is substantially complementary to said one side of said locking pin, whereby said one side of said further locking pin can engage said furthr notch in surface-to-surface engagement and receive full support throughout the full length of said surface-to-surface engagement in the event said plug has been removed from said female member and said female member is then dropped on said one end thereof.

6. A connect-disconnect coupling for fluid which comprises a female member, a sleeve member which encircles said female member, said female member having an outer surface, said sleeve member having an inner surface which bears against, and moves relative to, said outer surface on said female member, whereby said members are relatively moveable, a plug which is dimensioned to telescope into one end of said female member, locking means on said female member and on said plug that selectively respond to telescoping movement of said plug into said one end of said female member and to relative movement of said sleeve member and female member into plug-locked position to lock said plug in position within said one end of said female member and that respond to relative movement of said sleeve member and female member to plug-unlocked position to release said plug for movement away from said female member, said locking means including a plurality of openings in said female member and a locking ball in each of said openings, said opening being aligned but being spaced circumferentially of said female member, and further locking means on said sleeve member and on said female member which selectively lock said members against, or free said members for, relative movement, said further locking means including a locking pin on one of said members and a recess in the other of said members, said recess being in said female member and being, at least in part, coextensive with, and intermed into, two of said openings.

7. A connect-disconnect coupling as claimed in claim 6 wherein a part of the surface of said female member, adjacent said recess, is relieved to facilitate movement of said locking pin out of, and away from, said recess whenever said sleeve member is to be moved toward said one end of said female member.

8. A connect-disconnect coupling as claimed in claim 6 wherein a part of the surface of said female member, adjacent said recess, is relieved to facilitate movement of said locking pin out of, and away from, said recess whenever said sleeve member is to be moved toward said one end of said female member, and wherein all of said relieved part of said surface is coextensive with, and intermed into, said two of said openings.

9. A connect-disconnect coupling for fluid which comprises a female member, a sleeve member which encircles said female member, said female member having an outer surface, said sleeve member having an inner surface which bears against, and moves relative to, said outer surface on said female member, whereby said members are relatively moveable, a plug which is dimensioned to telescope into one end of said female member, locking means on said female member and on said plug that selectively respond to telescoping movement of said plug into said one end of said female member and to relative movement of said sleeve member and female member into plug-locked position to lock said plug in position within said one end of said female member and that respond to relative movement of said sleeve member and female member to plug-unlocked position to release said plug for movement away from said female member, and further locking means on said sleeve member and on said female member which selectively lock said members against, or free said members for, relative movement, said further locking means including a locking pin on one of said members and a recess in the other of said members, said recess having transverse dimensions which are larger than the transverse dimensions of said locking pin, said sleeve member moving toward said one end of said female member in the event said plug has been removed from said female member and said female member is dropped on said one end thereof, and a part of the surface of said other of said members is relieved to facilitate movement of said locking pin out of, and away from, said recess whenever said sleeve member is to be moved toward said one end of said female member, and wherein said relieved part is inclined to said outer surface of said female member.

10. A connect-disconnect coupling which comprises a female member that has a geometric axis, a sleeve member which encircles said female member, said female member and said sleeve member being relatively movable, a plug which is dimensioned to telescope into one end of said female member, locking means on said female member and complementary locking means on said plug that selectively respond to telescoping movement of said plug into said one end of said female member and to relative movement of said sleeve member and female member into plug-locked position to lock said plug in position within said one end of said female member and that respond to relative movement of said sleeve member and female member to plug-unlocked position to release said plug for movement away from said female member, and interacting means on said sleeve member and on said female member which require relative movement of said sleeve member and said female member in a progressive but not necessarily continuous direction of movement between said plug-unlocked position and a plug-locked position to cause said locking means on said female member to coact with said complementary locking means on said plug to lock said plug in position within said one end of said female member, said interacting means requiring relative movement in said progressive but not necessarily continuous direction of movement to occur in a predetermined sequence from said plug-unlocked position to said plug-locked position, said interacting means preventing accidental relative movement of said sleeve member and said female member in the return direction between said plug-locked position and said plug-unlocked position, said interacting means including a track on one of said members and a track-follower on the other of said members, said track having a portion thereof which is inclined to said geometric axis of said female member and which is intermediate said plug-locked position and said plug-unlocked position as said track is viewed in said progressive direction of movement, said inclined portion of said track being displaced from said geometric axis of said female member by an angle which is large enough to enable a force that is normal to said geometric axis of said female member and that is applied in a predetermined direction to force said track follower to move back along said inclined portion of said track toward said plug-locked position.

11. A connect-disconnect coupling as claimed in claim 10 wherein said angle is at least twenty degrees.

12. A connect-disconnect coupling as claimed in claim 10 wherein said track is in said female member, and wherein said track follower is carried by said sleeve member.

13. A connect-disconnect coupling as claimed in claim 10 wherein said angle is at least twenty degrees but is less than forty-five degrees.

14. A connect-disconnect coupling which comprises a female member that has a geometric axis, a sleeve member which encircles said female member, said female member and said sleeve member being relatively movable, a plug which is dimensioned to telescope into one end of said female member, locking means on said female member and complementary locking means on said plug that selectively respond to telescoping movement of said plug into said one end of said female member and to relative movement of said sleeve member and female member into plug-locked position to lock said plug in position within said one end of said female member and that respond to relative movement of said sleeve member and female member to plug-unlocked position to release said plug for movement away from said female member, and interacting means on said sleeve member and on said female member which require relative movement of said sleeve member and of said female member in a progressive but not necessarily continuous direction of movement between said plug-unlocked position and a plug-locked position to cause said locking means on said female member to coact with said complementary locking means on said plug to lock said plug in position within said one end of said female member, said interacting means requiring relative movement in said progressive but not necessarily continuous direction of movement to occur in a predetermined sequence from said plug-unlocked position to said plug-locked position and subsequently to said plug-unlocked position, said interacting means preventing accidental relative movement of said sleeve member and of said female member in the return direction between said plug-locked position and said plug-unlocked position, said interacting means including a track on one of said members and a track-follower on the other of said members, said track having a portion thereof which is intermediate said plug-locked position and said plug-unlocked position as said track is viewed in said progressive direction of movement and which subtends an acute angle which forces said track follower to experience an abrupt halting of its movement relative to said track and which also forces said track follower to experience an abrupt change of direction as it thereafter moves from said plug-locked position to said plug-unlocked position.

15. A connect-disconnect coupling as claimed in claim 14 wherein one part of said portion of said track is inclined to said geometric axis of said female member at an angle which is less than forty-five degrees, and wherein a further part of said portion of said track is inclined to said geometric axis of said female member at an angle which is greater than forty-five degrees but less than ninety degrees.

16. A connect-disconnect coupling as claimed in claim 14 wherein said acute angle is greater than forty-five degrees.

17. A connect-disconnect coupling which comprises a female member that has a geometric axis, a sleeve member which encircles said female member, said female member and said sleeve member being relatively movable, a plug which is dimensioned to telescope into one end of said female member, locking means on said female member and complementary locking means on said plug that selectively respond to telescoping movement of said plug into said one end of said female member and to relative movement of said sleeve member and female member into plug-locked position to lock said plug in position within said one end of said female member and that respond to relative movement of said sleeve member and female member to plug-unlocked position to release said plug for movement away from said female member, and interacting means on said sleeve member and on said female member which require relative movement of said sleeve member and said female member in a progressive but not necessarily continuous direction of movement between said plug-unlocked position and a plug-locked position to cause said locking means on said female member to coact with said complementary locking means on said plug to lock said plug in position within said one end of said female member, said interacting means requiring relative movement in said progressive but not necessarily continuous direction of movement to occur in a predetermined sequence from said plug-unlocked position to said plug-locked position and subsequently to said plug-unlocked position, said interacting means preventing accidental relative movement of said sleeve member and said female member in the return direction between said plug-locked position and said plug-unlocked position and also preventing accidental relative movement of said sleeve member and said female member in the return direction between a position beyond said plug-locked position and close to said plug-unlocked position and said plug-locked position, said interacting means including a track on one of said members and a track-follower on the other of said members, said track having a portion thereof which is intermediate said plug-unlocked position and said plug-locked position, said track having a further portion thereof which is intermediate said plug-locked position and said plug-unlocked position as said track is viewed in said progressive direction of movement, said further portion of said track subtending an angle, and said further portion of said track communicating with the first said portion of said track at a point which is close to said plug-unlocked position but wherein said female member and said sleeve member are in plug-locked position.

18. A connect-disconnect coupling as claimed in claim 17 wherein said track follower must pass through said said further portion of said track, must re-enter the first said portion of said track, and must move through said first said portion of said track before said female member and said sleeve member are in plug-unlocked position.

19. A connect-disconnect coupling as claimed in claim 17 wherein said further portion of said track and said first said portion of said track subtend an acute angle, that is larger than forty-five degrees, where said portions of said track are in communication.

20. A connect-disconnect coupling as claimed in claim 17 wherein said first said portion of said track is generally parallel to said geometric axis of said female member, wherein one part of said further portion of said track is displaced from said geometric axis of said female member by an acute angle, that is smaller than forty-five degrees, and wherein a further part of said further portion of said track is displaced from said geometric axis of said female member by an acute angle, that is greater than forty-five degrees.

21. A connect-disconnect coupling as claimed in claim 17 wherein said further portion of said track communicates with said first said portion of said track at a point close to, but spaced a finite distance from, said plug-unlocked position.

22. A connect-disconnect coupling which comprises a female member, a sleeve member which encircles said female member, said female member and said sleeve member being relatively movable, a plug which is dimensioned to telescope into one end of said female member, locking means on said female member and complementary locking means on said plug that selectively respond to telescoping movement of said plug into said one end of said female member and to relative movement of said sleeve member and female member into plug-locked position to lock said plug in position within said one end of said female member and that respond to relative movement of said sleeve member and female member to plug-unlocked position to release said plug for movement away from said female member, interacting means on said sleeve member and on said female member which require relative movement of said sleeve member and said female member in a progressive but not necessarily continuous direction of movement between said plug-unlocked position and a plug-locked position, and further interacting means on said female member and on said plug which prevent relative movement of said sleeve member and of said female member until said plug has been telescoped into said one end of said female member but which respond to telescoping of said plug of said sleeve member and female member to free said sleeve member and said female member for relative movement to cause said locking means on said female member to coact with said complementary locking means on said plug to lock said plug in position within said one end of said female member, the first said interacting means requiring relative movement of said sleeve member and female member in said progressive but not necessarily continuous direction of movement to occur in a predetermined sequence from said plug-unlocked position to said plug-locked position, said first said interacting means preventing accidental relative movement of said sleeve member and said female member in the return direction of movement between said plug-locked position and said plug-unlocked position, said locking means on said female member including a plurality of holes that selectively receive locking balls and that are displaced circumferentially of said female member, said further interacting means including two recesses in said female member that selectively receive locking pins, one of said recesses being positioned between one of said ball-receiving holes and a further ball-receiving hole, another of said recesses being positioned between a second ball-receiving hole and a still further ball-receiving hole, and the first said interacting means being positioned between said one and said second ball-receiving holes.

23. A connect-disconnect coupling as claimed in claim 22 wherein said female member has an external surface and an internal surface, wherein said recess of said further interacting means extend from said external surface to said internal surface, wherein each of said recesses has a notch adjacent to one side of, and in communication with, said recess, and wherein each of said notches extends inwardly from said external surface but does not extend to said internal surface.

24. A connect-disconnect coupling as claimed in claim 22 wherein each of said two recesses has a notch that is adjacent to one side of, and that communicates with, said recess, wherein said notches are adjacent those sides of said recesses which are closest to said one end of said female member, and wherein said notches have configurations that are complementary to the configurations of confronting portions of said locking pins.

25. A connect-disconnect coupling for fluid which comprises a tubular female member, a sleeve member which encircles said female member, said female member and said sleeve member being relatively movable, a tubular plug which is dimensioned to telescope into one end of said female member, locking means on said female member and complementary locking means on said plug that selectively respond to telescoping movement of said plug into said one end of said female member and to relative movement of said sleeve member and female member into plug-locked position to lock said plug in position within said one end of said female member and that respond to relative movement of said sleeve member and female member to plug-unlocked position to release said plug for movement away from said female member, interacting means on said sleeve member and on said female member which require relative movement of said sleeve member and said female member in a predetermined but not necessarily continuous direction of movement between a plug-unlocked fluid-off position and a plug-locked fluid-on position, said interacting means requiring said limited relative movement of said sleeve member and said female member to occur in said predetermined but not necessarily continuous direction of movement along a predetermined path while preventing accidental relative return movement of said sleeve member and said female member along said predetermined path, said interacting means responding to relative rotation and translation of said sleeve member and said female member along a second predetermined path, which is different from the first said predetermined path, to permit relative movement of said sleeve member and said female member from said plug-locked fluid-on position toward said plug-unlocked fluid-off position, said plug being in said plug-locked position and said fluid being "on" throughout the time said relative movement of said sleeve member and said female member occurs along said second predetermined path, said second predetermined path leading to, and being contiguous with, said first predetermined path and said plug remaining in plug-locked position and said fluid remaining "on" until said relative movement of said sleeve member and said female member reaches the first said predetermined path.

26. A connect-disconnect coupling as claimed in claim 25 wherein said interacting means includes a track on one of said members and a track follower on the other of said members.

27. A connect-disconnect coupling as claimed in claim 25 wherein said plug remains in plug-locked position and said fluid remains "on" until said relative movement of said sleeve member and said female member not only reaches said first said predetermined path but also moves along said first predetermined path away from said plug-locked fluid-on position.

28. A connect-disconnect coupling which comprises a female member that has a geometric axis, a sleeve member which encircles said female member, said female member and said sleeve member being relatively movable, a plug which is dimensioned to telescope into one end of said female member, locking means on said female member and complementary locking means on said plug that selectively respond to telescoping movement of said plug into said one end of said female member and to relative movement of said sleeve member and female member into plug-locked position to lock said plug in position within said one end of said female member and that respond to relative movement of said sleeve member and female member to plug-unlocked position to release said plug for movement away from said female member, and interacting means on said sleeve member and on said female member which require relative movement of said sleeve member and of said female member in a progressive but not necessarily continuous direction of movement between said plug-unlocked position and a plug-locked position to cause said locking means on said female member to coact with said complementary locking means on said plug to lock said plug in position within said one end of said female member, said interacting means requiring relative movement in said progressive but not necessarily continuous direction of movement to occur in a predetermined sequence from said plug-unlocked position to said plug-locked position and subsequently to said plug-unlocked position, said interacting means preventing accidental relative movement of said sleeve member and of said female member in the return direction between said plug-locked position and said plug-unlocked position, said interacting means including a track on one of said members and a track-follower on the other of said members, said track having a portion thereof which is intermediate said plug-locked position and said plug-unlocked position as said track is viewed in said progressive direction of movement and which forces said track follower to experience an abrupt halting of its movement toward said plug-unlocked position and then to experience an abrupt change of direction as it resumes its movement toward said plug-unlocked position, said track having a further portion which is intermediate the first said portion and said plug-unlocked position as said track is viewed in said progressive direction of movement which forces said track follower to experience a further abrupt halting of its movement toward said plug-unlocked position and then to experience a further abrupt change of direction as it resumes its movement toward said plug-unlocked position.

29. A connect-disconnect coupling as claimed in claim 28 wherein said first said portion includes a track section and another track section which subtend an acute angle.

* * * * *